United States Patent [19]
Ramsey

[11] Patent Number: 5,403,179
[45] Date of Patent: Apr. 4, 1995

[54] COLLAPSIBLE MOLD CORE ASSEMBLY

[76] Inventor: William C. Ramsey, R.R. #5, Bryan, Ohio 43506

[21] Appl. No.: 145,884

[22] Filed: Oct. 29, 1993

[51] Int. Cl.⁶ .............................................. B29C 45/44
[52] U.S. Cl. ..................................... 425/577; 264/318; 425/438; 425/DIG. 58
[58] Field of Search ............... 425/577, 438, DIG. 58, 425/556; 264/318, 334

[56] References Cited

U.S. PATENT DOCUMENTS

| | | | |
|---|---|---|---|
| 3,247,548 | 4/1966 | Fields et al. | 425/438 |
| 3,660,001 | 5/1972 | Roehr | 425/396 |
| 4,209,161 | 6/1980 | Horvath | 249/180 |
| 4,286,766 | 9/1981 | Von Holdt | 249/144 |
| 4,362,291 | 12/1982 | Fuke et al. | 249/144 |
| 4,378,928 | 4/1983 | Kopp et al. | 249/63 |
| 4,383,819 | 5/1983 | Letica | 425/577 |
| 4,533,312 | 8/1985 | Von Holdt | 425/438 |
| 4,541,605 | 9/1985 | Kubota et al. | 249/142 |
| 4,627,810 | 12/1986 | Von Holdt | 425/577 |
| 4,731,014 | 3/1988 | Von Holdt | 425/556 |
| 4,756,865 | 7/1988 | Von Holdt | 264/334 |
| 4,771,981 | 9/1988 | Little et al. | 249/79 |
| 4,832,307 | 5/1989 | Watanabe et al. | 249/63 |
| 4,861,257 | 8/1989 | Siotani | 425/438 |

OTHER PUBLICATIONS

Pp. K-42 and K-43 of Catalog of D-M-E Co., Madison Heights, Mich., date unknown.

*Primary Examiner*—Tim Heitbrink
*Attorney, Agent, or Firm*—Willian Brinks Hofer Gilson & Lione

[57] ABSTRACT

A collapsible mold core assembly facilitates formation of features such as channels and undercuts in interior regions of molded articles. The assembly includes a central, fixed pyramidial base member having a first plurality of obliquely oriented channels which receive a like plurality of first mold core segments and a second plurality of parallel channels interleaved with the first plurality of channels. The second plurality of channels receives a like plurality of intermediate members which, in turn, receive a like plurality of second mold core segments. The plurality of first mold segments withdraws from the mold and the plurality of second mold segments, which are constrained to move generally radially within the mold collapse radially inwardly to facilitate removal of the molded part.

20 Claims, 6 Drawing Sheets

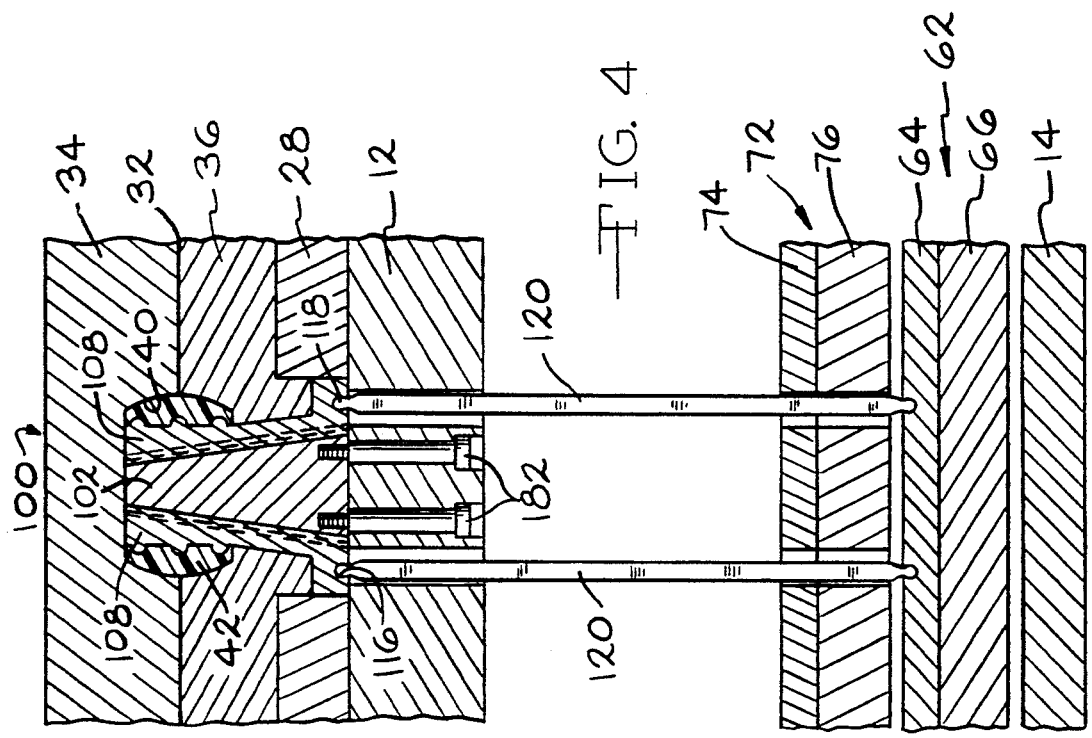
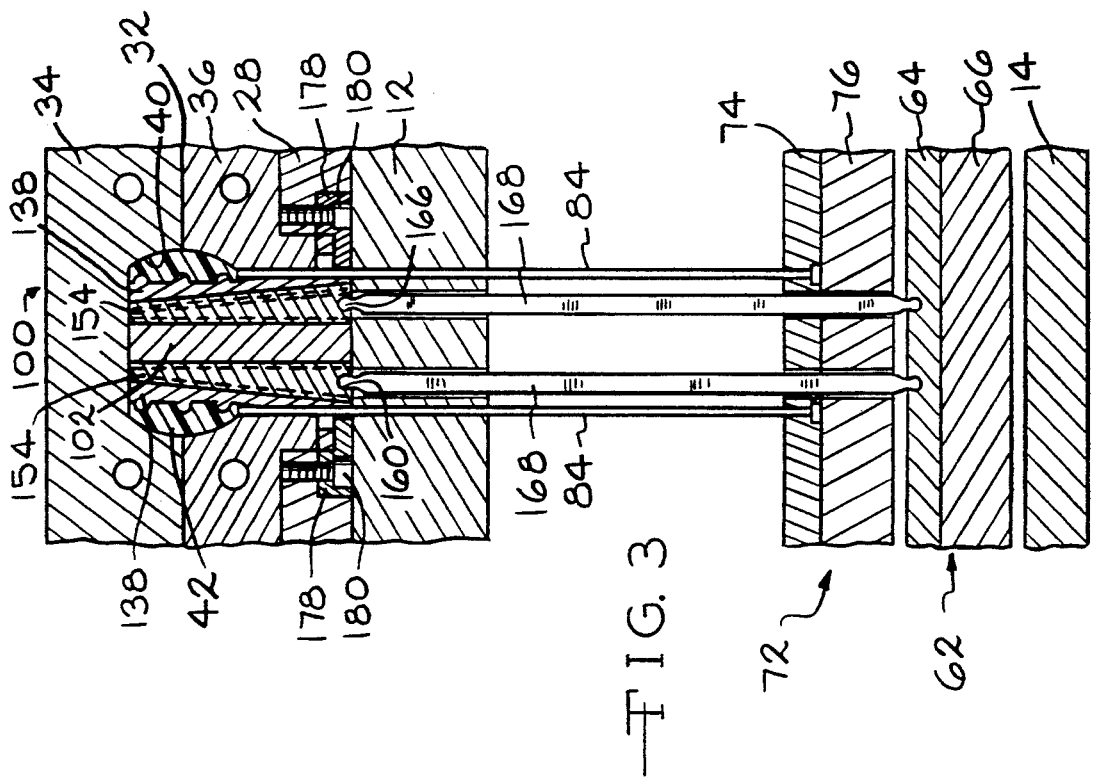

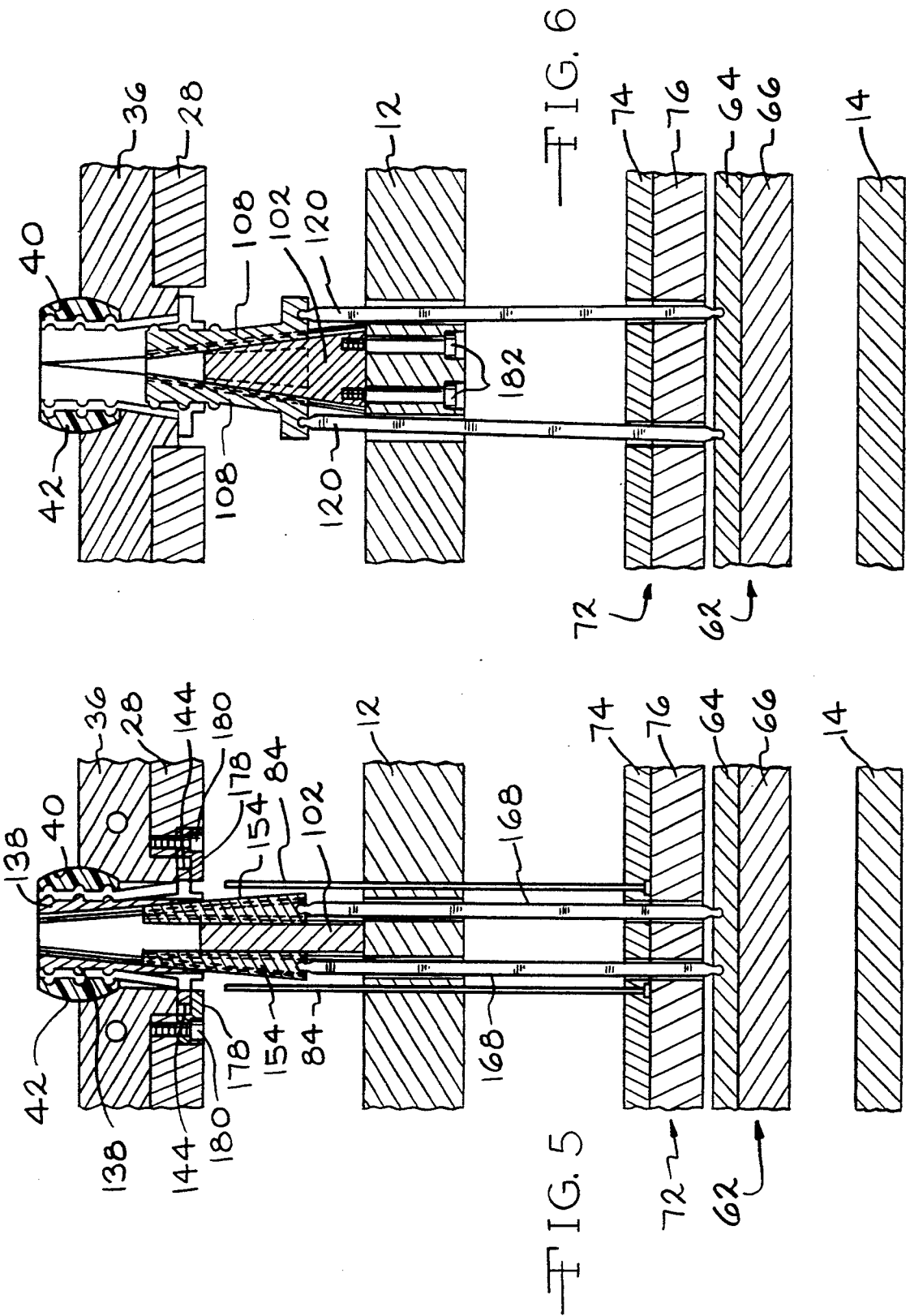

COLLAPSIBLE MOLD CORE ASSEMBLY

BACKGROUND OF THE INVENTION

The invention relates generally to components for molding machines and more specifically to a collapsible mold core assembly typically utilized with an injection molding apparatus.

A constant challenge to mold designers has been the creation of mold structures to produce internal passageways or interior features in a molded product. With sand cast products, sand cores and similar one-use structures typically made from recyclable material are formed into a desired configuration. Subsequent to casting, the sand cores are broken down and the sand is removed and reused.

The advent of plastic molding materials and injection molding apparatus dictated a new approach to core removal. With injection molding apparatus, the sand contamination and the relatively slow production rates associated with destructible sand cores was generally unsuitable. Accordingly, collapsible mechanical configurations having high dimensional accuracy and repeatability have been developed. Typically, a structure disposed centrally within the mold receives and locates a plurality of mold segments which are movable into and out of a component molding position.

For example, U.S. Pat. Nos. 4,383,819 to Letica, 4,731,014 to Von Holdt and 4,756,865 also to Von Holdt teach mold configurations wherein both exterior and interior mold segments dissemble to permit removal of the molded part. U.S. Pat. Nos. 4,362,291 to Fuke et al. and 4,832,307 to Watanabe et al. disclose mold configurations wherein both interior and exterior mold segments are constrained to travel along oblique paths.

U.S. Pat. Nos. 4,378,928 to Kopp et al., 4,533,312 to Von Holdt and 4,627,810 also to Von Holdt teach primary interior mold segments extending through a 120° arc and secondary, fractional mold segments. U.S. Pat. No. 4,541,605 to Kubota teaches a similar configuration having four mold segments.

The configuration and attendant operation of the foregoing devices represent a broad spectrum of approaches to the various problems associated with producing molded parts with undercuts and collapsible cores. A review of such patents also reveals that improvements in the art of collapsible core molds to produce an even wider variety of molded parts is both desirable and possible.

SUMMARY OF THE INVENTION

A collapsible mold core assembly facilitates formation of features such as channels and undercuts in interior regions of molded articles. The assembly includes a central, fixed pyramidial base member having a first plurality of obliquely oriented channels which receive a like plurality of first mold core segments and a second plurality of parallel channels interleaved with the first plurality of channels. The second plurality of channels receives a like plurality of intermediate members which, in turn, receive a like plurality of second mold core segments. The mold defines upper and lower portions meeting along a parting line which is generally normal to the axis of the pyramidial base member.

The first mold core segments and the intermediate members are coupled by suitable linkages to a first ejector plate. After the mold is opened along the parting line, the first ejector plate is translated and then the mold is translated relative to the first ejector plate. The plurality of first mold core segments withdraws from the mold and the plurality of second mold core segments, which are constrained to move generally radially within the mold, collapses or contracts radially inwardly to facilitate removal of the molded part. A plurality of ejector pins coupled to a second ejector plate dislodges the part from the mold. Circular or polygonal parts having diverse interior features such as ribs, channels and undercuts may be readily produced by the collapsible mold core assembly of the present invention.

The use of individual core mold segments facilitates easy and inexpensive repair of the core mold assembly if damage thereto occurs, inasmuch as only the damaged core segments need be replaced, not the entire assembly.

It is thus an object of the present invention to provide a collapsible mold core assembly capable of producing circular or polygonal components having diverse interior features.

It is a further object of the present invention to provide a collapsible mold core assembly having multiple identical parts.

It is a still further object of the present invention to provide a collapsible mold core assembly readily disposable within a conventional injection molding apparatus.

It is a still further object of the present invention to provide a collapsible mold core assembly requiring only unidirectional motion to collapse the mold core.

It is a still further object of the present invention to provide a collapsible mold core assembly wherein a first drive assembly parts the mold, a second drive assembly collapses the mold core and a third drive assembly ejects the part.

It is a still further object of the present invention to provide a collapsible mold core assembly wherein a central pyramidial member includes a first plurality of parallel channels and a second, interleaved plurality of upwardly converging oblique channels.

It is a still further object of the present invention to provide a collapsible mold core assembly wherein a plurality of first mold core segments are slidingly disposed upon a central pyramidial member and a plurality of second mold core segments are slidingly disposed upon tapering intermediate members which are in turn slidingly disposed upon the central pyramidial member.

It is a still further object of the present invention to provide a collapsible mold core assembly having individual segments which facilitates inexpensive repair inasmuch as only damaged segments of an assembly need by replaced.

Further objects and advantages of the present invention will become apparent by reference to the following description of the preferred embodiment and appended drawings.

BRIEF DESCRIPTION OF THE DRAWINGS

FIG. 3 is an enlarged, fragmentary sectional view of an injection molding apparatus and collapsible mold core assembly according to the present invention in the molding position;

FIG. 4 is an enlarged, fragmentary sectional view of an injection molding apparatus and collapsible mold core assembly according to the present invention in the molding position rotated through an angle of 45° relative to FIG. 3;

FIG. 5 is an enlarged, fragmentary sectional view of a collapsible mold core assembly according to the present invention in a collapsed position and with the mold open;

FIG. 6 is an enlarged, fragmentary sectional view of a collapsible mold core assembly according to the present invention in a collapsed position, with the mold open and rotated through an angle of 45° relative to FIG. 5;

DESCRIPTION OF THE PREFERRED EMBODIMENT

Figure 1:
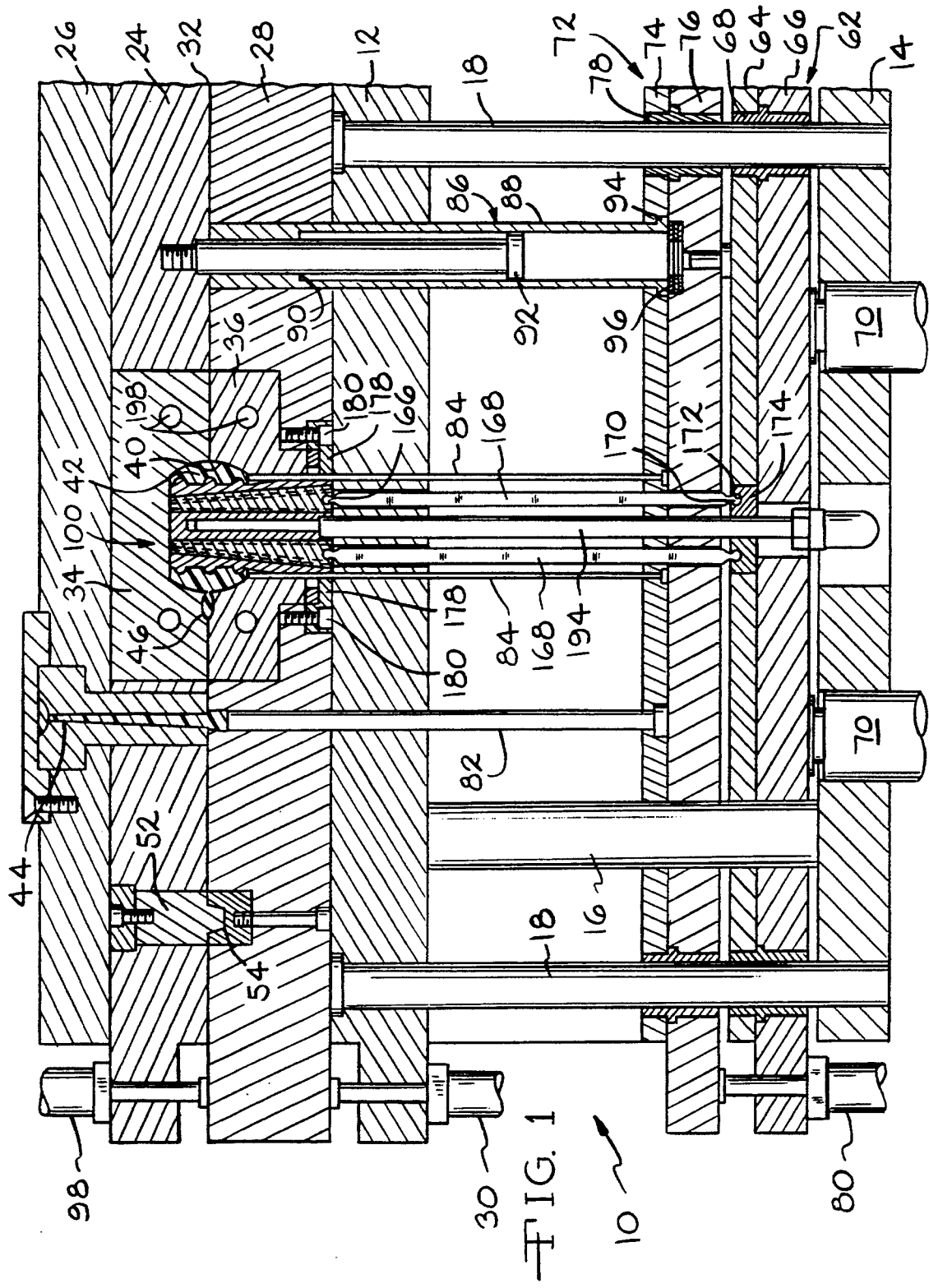
FIG. 1 is a first full, sectional view of a portion of an injection molding apparatus incorporating the present invention taken through the center of the mold cavity.
Figure 2:
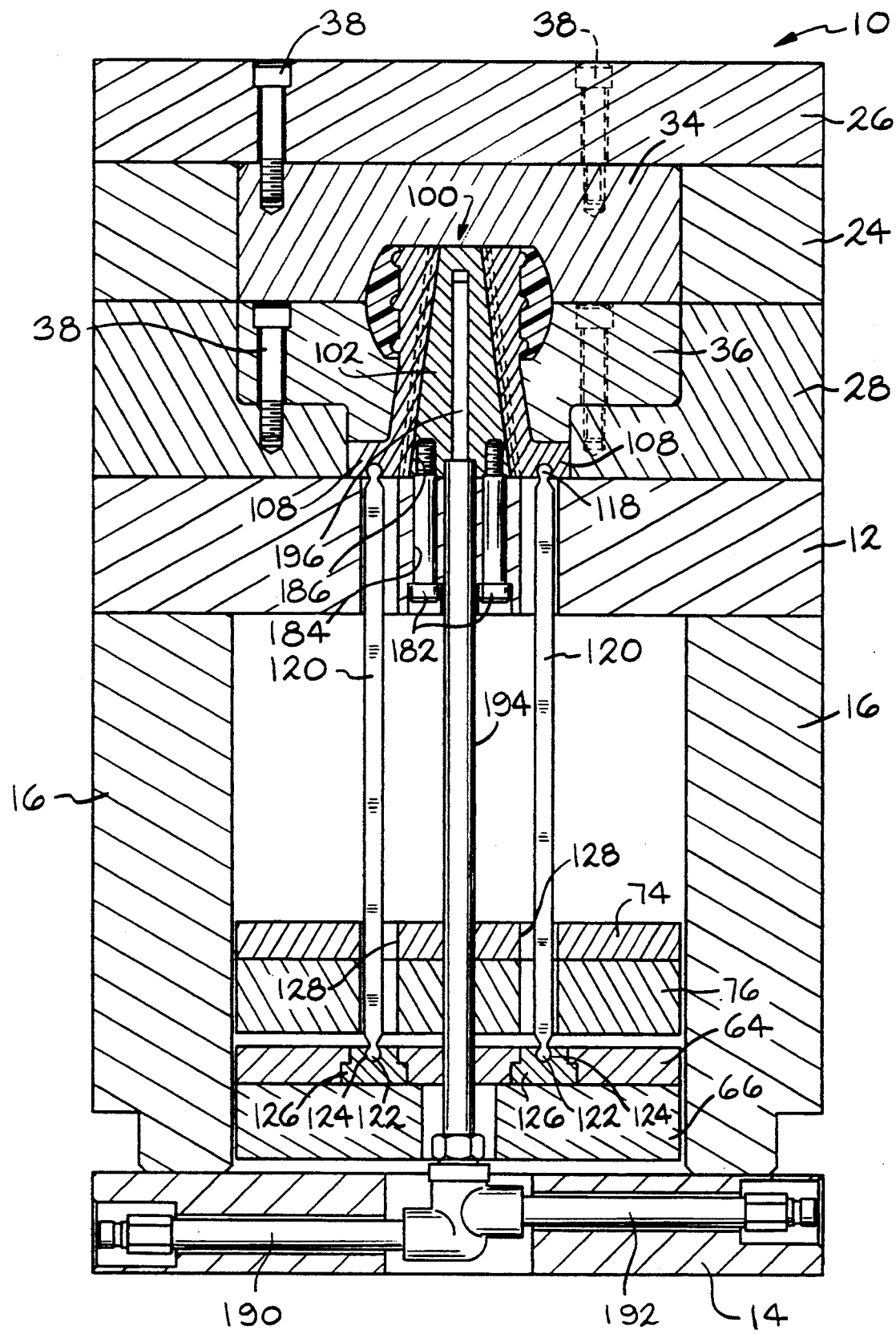
FIG. 2 is a second full, sectional view of a portion of an injection molding apparatus incorporating the present invention taken through the center of the mold cavity and rotated through an angle of 45° relative to FIG. 1.

At the outset, it should be noted that FIGS. 2, 4 and 6 present views of an injection molding apparatus and specifically a collapsible core assembly which are rotated 45° about the center axis of the mold and core, later referred to as reference axis A, relative to the views presented in FIGS. 1, 3, 5 and 7.

Referring now to FIGS. 1 and 2, relevant portions of an injection molding apparatus are illustrated and generally designated by the reference numeral 10. The injection molding apparatus 10 includes a plurality of fixed and relatively movable plates which effect opening and closing of a mold cavity as well as collapse of a mold core assembly and ejectment of a fabricated part. As such, the injection molding apparatus 10 includes a first, fixed clamp plate or frame section 12 and a second, fixed support plate or frame section 14. The first, fixed frame section 12 and the second, fixed frame section 14 are coupled and secured together by a plurality of suitably positioned spacing members 16 and guide columns 18. The guide columns 18 are preferably cylindrical and include exterior surfaces which function as elongate bearing surfaces upon which various other components of the injection molding apparatus 10 translate. The guide columns 18 secure and align the first, fixed frame section 12 to the second, fixed frame section 14 at a distance determined by the spacing members 16 as will be readily appreciated.

Disposed adjacent and generally above the first, fixed frame section 12 are platens which are associated with the molding process. A first, upper platen 24 is secured to a parallel backup plate 26 and disposed adjacent a stripper plate or second, lower platen 28. The first, upper platen is parallel to the second, lower platen 28 and is translatable therefrom along an axis perpendicular to the parallel planes defined by the platens 24 and 28. A plurality of linear actuators 30, one of which is illustrated in FIG. 1, translates the first, upper platen 24 and backup plate 26 away from the second, lower platen 28 or draws the platens together to the position illustrated in FIG. 1 in response to receipt of appropriate energy or a control signal. The linear actuators 30 may be pneumatic cylinders, hydraulic cylinders, linear motors, ball screw actuators or any other mechanical devices providing suitable translation of the first, upper platen 24 and backup plate 26 relative to the second, lower platen 28.

The adjacent faces of the first, upper platen 24 and the second, lower platen 28 define a parting line 32. The first, upper platen 24 and the second, lower platen 28 also define open regions which receive an upper mold portion 34 and a lower mold portion 36, respectively. The mold portions 34 and 36 are removably secured to the respective platens 24 and 28 by any suitable fastening means such as threaded fasteners 38. The mold portions 34 and 36 cooperatively define a mold cavity 40 which in FIG. 1 has been filled with a plastic molding media and forms a molded circular part 42. The molded part 42 is presented for purposes of illustration and example only and it should be understood that a wide range of polygonal or irregular parts with diverse interior features may be fabricated with the present invention. The mold cavity 40 is preferably either symmetrically horizontally bisected or bisected at its greatest diameter and/or planar area by the parting line 32. A gate 44 and a plurality of runners 46, one of which is illustrated in FIG. 1, provide passageways to the mold cavity 40 to facilitate the injection of moldable media thereinto in accordance with conventional practice. Various registration devices such as a registration pin 52 and registration socket 54 ensure alignment of the various platen and mold portions when the mold cavity 40 is closed.

Disposed in the lower portion of the injection molding apparatus 10 and generally adjacent the second, fixed frame section 14 are a pair of ejector plate assemblies. A first ejector plate assembly 62 includes a first retaining plate 64 and a first base plate 66. The first plates 64 and 66 are secured together by suitable fasteners (not illustrated) and capture a plurality of bushings 68, two of which are illustrated in FIG. 1. The bushings 68 slidably receive the guide columns 18 and facilitate smooth, low friction translation of the first ejector plate assembly 62 therealong.

Disposed immediately above and adjacent the first ejector plate assembly 62 is a second ejector plate assembly 72. The second ejector plate assembly 72 includes a second retaining plate 74 and a second base plate 76. The second plates 74 and 76 are likewise secured together by suitable fasteners (not illustrated) and capture a plurality of bushings 78, two of which are illustrated in FIG. 1. The bushings 78 slidably receive the guide columns 18 and facilitate smooth, low friction axial translation of the second ejector plate assembly 72 therealong.

A plurality of linear actuators 70, two of which are illustrated in FIG. 1, which may be either hydraulic or pneumatic piston and cylinder assemblies or linear or ball screw electric motors, bidirectionally translate the first ejector plate assembly 62 and the second ejector plate assembly 72 in unison relative to the first and second, fixed frame sections 12 and 14. A plurality of linear actuators 80, one of which is illustrated in FIG. 1 and which, again, may be pneumatic, hydraulic or electric devices, are operably disposed between the first ejector plate assembly 62 and the second ejector plate assembly 72. Actuation of the linear actuators 80 translates the second ejector plate assembly 72 relative to the first ejector plate assembly 62.

Coupled to the second ejector plate assembly 72 are a plurality of ejector pins. A first ejector pin 82 is aligned with the gate 44 and removes molding media from the gate 44 when the first, upper platen 24 has been translated away from the second, lower platen 28 and the linear actuations 70 and 80 have been activated to translate the ejector plate assemblies 72 and 82. Additional ejector pins (not illustrated) may be utilized to eject molding media lodged in the runner 46. A plurality of ejector pins 84, two of which are illustrated in FIG. 1, are also coupled to the second ejector plate 72 and align with the mold cavity 40. The plurality of ejector pins 84 cooperatively eject the molded part 42 from the mold cavity 40 when the second ejector plate assembly 72 is translated relative to the first ejector plate assembly 62 and the first, upper platen 24 is separated from the second, lower platen 28.

Also as shown in FIG. 1, a damper and travel limit assembly 86 is disposed perpendicularly between the platens 24 and 28 and the second ejector plate assembly 72. Specifically, a hollow cylinder 88 defines a shoulder 90 and receives a piston member 92 having an enlarged head. The member 92 is secured through suitable means to the first, upper platen 24. One end of the cylinder 88 abuts the first, upper platen 24. The other end of the cylinder 88 includes a shoulder 94 which is received between and trapped by the second retaining plate 74 and the second base plate 76 of the second ejector plate assembly 72. The shoulder 94 of the cylinder 90 is aligned with and engages a stack of Belleville washers 96 which is received within a suitable aperture of the second base plate 76 of the second ejector plate assembly 72. As such, the cylinder 88 defines a minimum spacing between the first, upper platen 24 and the second ejector plate assembly 72. The damper and limit stop assembly 86 also determines the maximum separation between these components as determined by contact between the shoulder 90 and the enlarged head of the piston member 94. As the first, upper platen 24 returns to the position illustrated in FIG. 2, the stack of Belleville washers 96 cushions such terminal travel. It should be noted that multiple damper and travel limit assemblies 86 may be utilized, if desired.

A plurality of actuators 98, one of which is illustrated in FIG. 1, which may be either hydraulic or pneumatic piston and cylinder assemblies, or linear or ball screw electric motors, are connected between the first, upper platen 24 and the second, lower platen 28 and separates the platens along the parting way 32 upon receipt of energy or an appropriate control signal.

Figure 9:
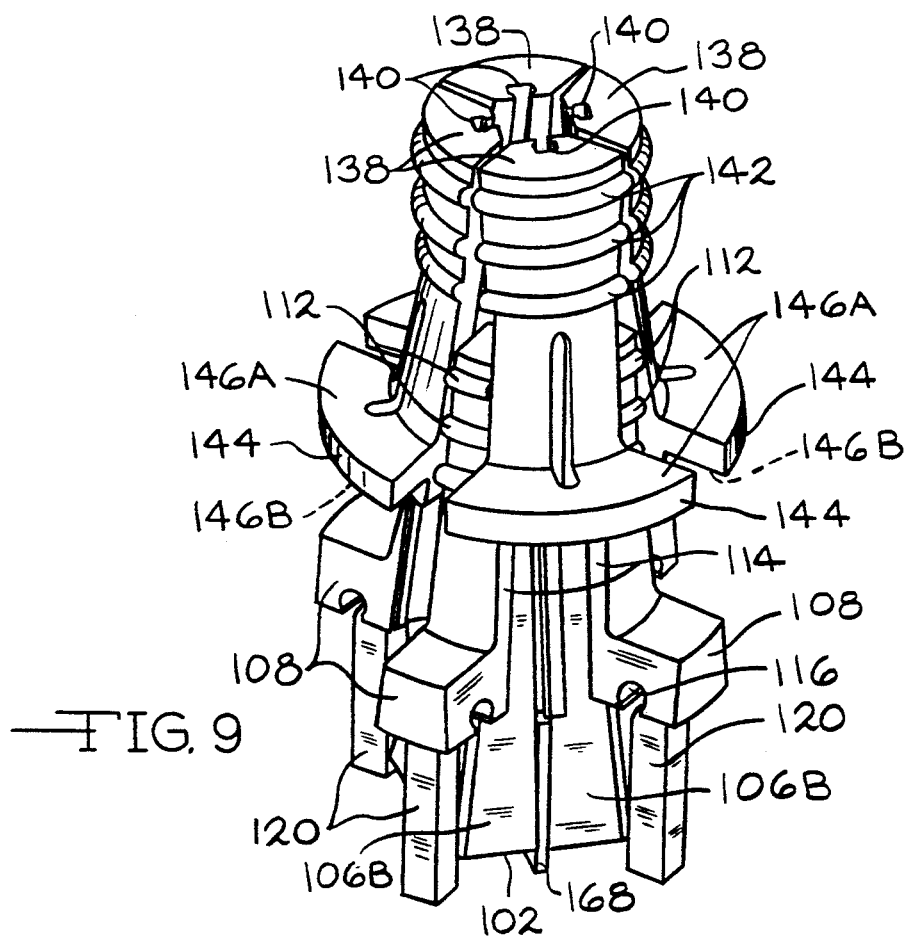
FIG. 9 is an enlarged, perspective view of collapsible mold core assembly according to the present invention in the collapsed position.

Referring now to FIGS. 2 and 9, the injection molding apparatus 10 includes a collapsible mold core assembly 100 disposed within the mold cavity 40. The collapsible mold core assembly 100 preferably includes a centrally disposed stanchion or truncated pyramidial member 102. The pyramidial member 102 defines a center reference axis A. The pyramidial member 102 includes a first plurality of obliquely oriented T-shaped channels or slots 104. The T-shaped slots 104 converge in an upward direction, i.e., away from its base and are oriented at a small acute angle of sufficient magnitude to effect sufficient radial motion of the core segments to clear undercuts or other features and permit removal of the part 42 from the mold cavity 40 as will be more fully explained subsequently. Typically, the small acute angle will be between about 2° and 8° and, in the configuration illustrated, the angle is about 4° to the reference axis A.

In the configuration illustrated, four such obliquely oriented, T-shaped slots 104 are disposed at 90° intervals about the pyramidial member 102. A first plurality of surfaces 106A of the pyramidial member 102 immediately adjacent the T-shaped slots 104 are likewise oblique and are parallel to the T-shaped slots 104 disposed thereadjacent. A second plurality of wider surfaces 106B are interleaved or disposed in alternation with the first plurality of surfaces 106A and are likewise obliquely oriented at a small acute angle of between about 2° and 8° and preferably about 4° to the reference axis A.

A plurality of first mold segments 108, four in the example shown, include T-shaped projections 110 which are complementary to and slidably received within the like plurality of first, obliquely disposed T-shaped slots 104. The first mold segments 108 include features such as circumferential ribs 112 and diverse other features (not illustrated) on their outer faces, i.e., the faces opposite the T-shaped projections 110, which define the inner features and interior of the molded part 42. Clearly a wide variety of features on the outer surfaces of the first mold segments 108 may be included to provide corresponding features on the interior surface of a molded part such as the part 42. The plurality of first mold segments 108 also each preferably define a pair of opposed sidewalls 114. The sidewalls 114 upwardly converge at a small acute angle and are slightly farther apart at the rear, adjacent the T-shaped projection 110 than at the front.

At the lower extremity of each of the plurality of first mold segments 108 is a socket 116 which receives a correspondingly configured first knuckle 118 of a first ejector blade 120. The first ejector blade 120 includes a second knuckle 122 at its opposite end which is received within a corresponding second socket 124 of a retaining block 126 which is disposed and trapped between the first plates 64 and 66 of the first ejector plate assembly 62. As illustrated in FIG. 2, each of the plurality of first mold segments 108 is linked by a respective one of a first plurality ejector blades 120 to the first ejector plate assembly 62. The first ejector blades 120 pass through apertures 128 in the second ejector plate assembly 72.

Figure 10:
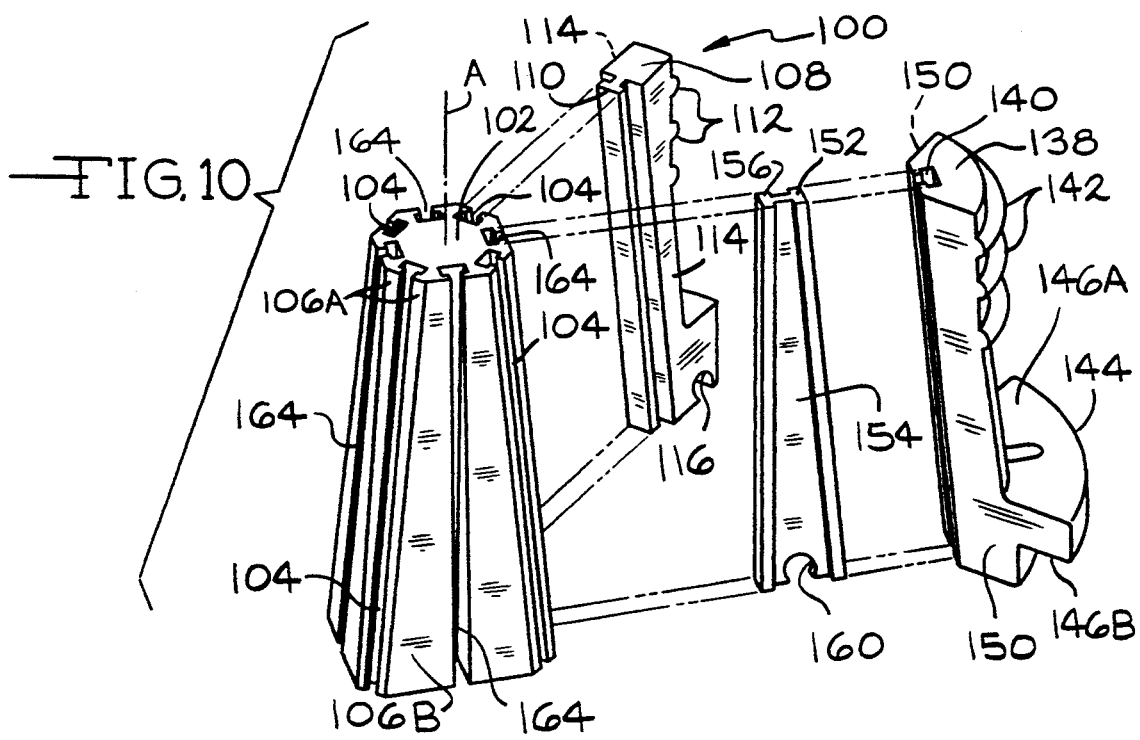
FIG. 10 is an exploded perspective view of a portion of the components of a collapsible mold core assembly according to the present invention.

Referring now to FIGS. 1 and 10, the mold core assembly 100 also includes a plurality of second mold core segments 138, one of which is illustrated in FIG. 10. In the illustrated configuration, four second mold core segments 138 are utilized. Each of the second mold core segments 138 includes a longitudinal T-shaped channel or slot 140 which extends its full length. The exterior surface of the plurality of second mold core segments 138 includes features such as circumferential ribs 142 which typically align with the circumferential ribs 112 on the plurality of first mold core segments 108 to complete a specific feature or interior pattern within the mold cavity 40 to produce a corresponding pattern on the molded part 42. The plurality of second mold core segments 138 also each includes an outwardly directed flange 144 having parallel upper and lower surfaces 146A and 146B.

Each of the second mold core segments 138 define a pair of sidewalls 150 oriented at substantially a right angle to one another. The sidewalls 150 are also substantially parallel to the sidewalls 114 of the first mold core segments 108 when the mold core assembly 100 is in the molding position illustrated in, for example, FIG. 8. Received within the T-shaped slots 140 of each of the second mold core segments 138 is a complementally configured T-shaped projection 152 which forms a portion of a like plurality of intermediate members 154. Once again, in the configuration shown, four intermediate members 154 are utilized. Each of the plurality of intermediate members 154 defines a shallow acute angle of between about 2° to 8° and preferably about 4° and includes a second opposed T-shaped projection 156 on its opposite edge. The intermediate members 154 thus define a generally H-shaped pattern in cross section. At the wider (lower) end of each of the plurality of intermediate members 154 is disposed a second socket 160. The second T-shaped projections 156 of the intermediate members 154 are received within vertically oriented, i.e., parallel to the reference axis A, T-shaped channels or slots 164 formed in the pyramidial member 102.

While the sliding interconnections between the pyramidial member 102 and the plurality of first mold core segments 108, the plurality of second mold core segments 138 and the intermediate members 154 have been described above as specifically arranged complementary slots and projections having specific (T-shaped) cross-sections, it should be readily understood that, first of all, the locations of slots and projections may be interchanged, that is, the pyramidial member 102 and the plurality of second mold segments 138 may include T-shaped projections and the plurality of first mold core segments 108 and the intermediate members 154 may therefore include complementary T-shaped slots and, second of all, that analogous mechanical configurations such as cylindrical members received within cylindrical channels and other structures providing analogous confined, i.e., axial, bidirectional sliding motion are considered to be equivalents of the structures disclosed and may be readily substituted therefor. Such analogous and equivalent structures and reversed or interchanged locations of male and female structures are all considered to be well within the scope of the present invention.

As illustrated in FIG. 1, the second sockets 160 of the intermediate members 154 each receive a knuckle 166 which defines a terminal portion of a respective one of a second plurality of ejector blades 168. The opposite ends of the ejector blades 168 are likewise configured in knuckles 170 which are received within complemental sockets 172 in a respective plurality of retainer blocks 174. The retainer blocks 174 are disposed and trapped between the plates 64 and 66 of the first ejector plate assembly 62.

The plurality of second mold core segments 138 are constrained for horizontal motion, i.e., motion normal to the reference axis A, and slidably disposed adjacent the lower mold portion 36 in the second, lower platen 28 by a like plurality of restraining brackets or lugs 178 which engage the lower surfaces 146B of the flanges 144. The restraining brackets or lugs 178 are removably retained in the second, lower platen 28 by a like plurality of threaded fasteners 180 or other suitable means.

As illustrated in FIG. 2, the pyramidial member 102 is preferably removably secured to the first, fixed frame section 12 by one or more threaded fasteners 182, two of which are illustrated in FIG. 2, which extend through shouldered passageways 184 in the first, fixed frame section 12 and into threaded openings 186 in the pyramidial member 102.

A flow of cooling fluid may be provided to the pyramidial member 102 through inlet and outlet lines 190 and 192, respectively, which provide a flow of fluid to a coaxial standpipe 194 which provides cooling fluid to and from a coaxial passageway 196 disposed centrally within the pyramidial member 102. Likewise, cooling fluid passageways 198 are defined by the upper and lower mold portions 34 and 36.

It will be appreciated that whereas the foregoing text describes a collapsible mold core assembly 100 incorporating four first mold core segments and four second mold core segments, the invention is not so limited and may be practiced utilizing any total number of first and second mold core segments and wherein said total number is at least four and is even, i.e., divisible by two.

Figure 8:
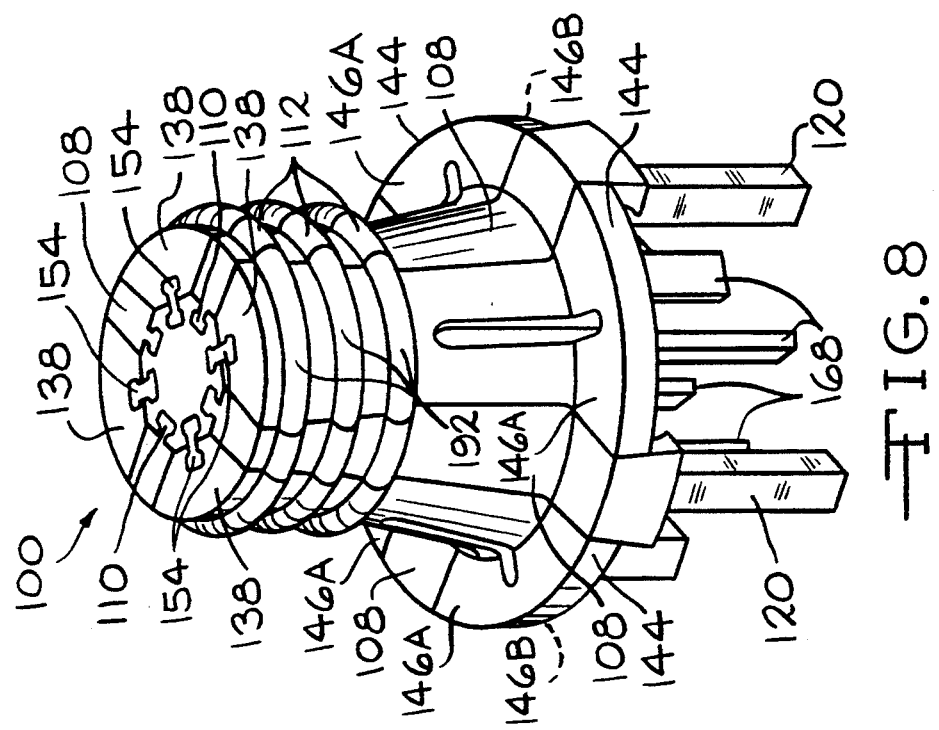
FIG. 8 is an enlarged, perspective view of a collapsible mold core assembly according to the present invention in the molding position.
Figure 7:
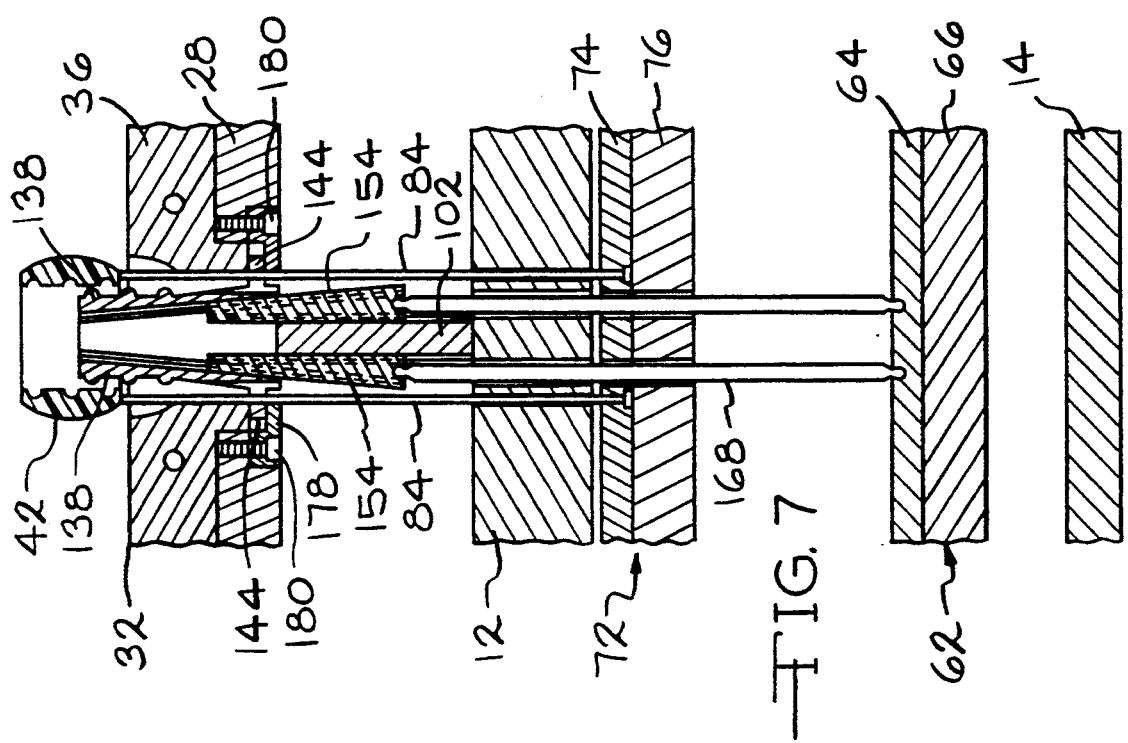
FIG. 7 is an enlarged, fragmentary sectional view of a collapsible mold core assembly according to the present invention with the mold open and part ejected.

Operation of the collapsible core mold assembly 100 according to the present invention will now be described. The injection molding apparatus 10 begins an operating cycle with its various assemblies in the positions illustrated in FIGS. 1 and 2. The collapsible mold core assembly 100 and its associated components will then be as illustrated in FIGS. 3, 4 and 8. At this time, molding media is injected through the gate 44 and the runners 46 into the mold cavity 40 to form the part 42. As noted, the part 42 may be circular, as illustrated, or have virtually any polygonal or irregular exterior shape generally incorporating sufficient draft to facilitate its removal from the mold cavity 40. The interior configuration of the part may likewise have diverse continuous or discontinuous features on a circular, curved, irregular or polygonal surface. It should be appreciated that the molded circular part 42 illustrated having three spaced-apart interior re-entrant circular channels is merely illustrative of a diversity of possible configurations.

Upon appropriate cooling of the molding media of which the part 42 is formed, steps achieving opening of the mold cavity 40, collapse of the mold core assembly 100 and ejection of the part 42 commence. Initially, the linear actuators 98 may be activated to fully separate the first, upper platen 24 from the second, lower platen 28 along the parting line 32. Then, the linear actuators 70 are activated to translate the first ejector plate assembly 62 and the second ejector plate assembly 72 in unison toward the first, fixed frame section 12. The linear actuators 70 provide, in a typical injection molding apparatus 10, initial translation sufficient to initiate collapse of the mold core assembly 100. In a typical installation this translation may be approximately one inch (2.6 cm.). Such initial translation of the first ejector plate assembly 62 drives the first plurality of ejector blades 120, the second plurality of ejector blades 168 and the lower platen 28 vertically upward. The first plurality of ejector blades 120 are directly coupled to the plurality of first mold core segments 108 which, therefore, translate obliquely upwardly and inwardly along the T-shaped slots 104 and the adjacent converging surfaces 106A of the pyramidial member 102.

As noted and illustrated in FIGS. 1 and 3, the second plurality of ejector blades 168 are directly coupled to the plurality of intermediate members 154. The interconnected plurality of second mold core segments 138 are, however, constrained by cooperation of the flanges 144 and the brackets 178 to motion only perpendicularly to the reference axis A of the pyramidial member 102. Furthermore, since the only relative vertical motion with regard to the plurality of second mold core segments 138, the intermediate members 154 and the pyramidial member 102 occurring to this point occurs between the pyramidial member 102 which is fixed and the intermediate members 154 which are coupled to and driven vertically by the second plurality of ejector blades 168 and further because the sliding interconnections between the T-shaped slots 164 of the pyramidial member 102 and the T-shaped projections 156 of the intermediate members 154 are vertically constrained, no radial motion of the plurality of second mold core segments 138 initially occurs.

After the initial, in unison translation of the platens 24 and 28 with the ejector plate assemblies 62 and 72, the ejector plate assemblies 62 and 72 cease translation. The linear actuators 30 are then activated and the platens 24 and 28 continue to translate away from the fixed frame section 12 and the ejector plate assemblies 62 and 72. This translation continues for, in the configuration illustrated, a distance sufficient to provide sufficient collapse of the mold core assembly 100 to provide clearance for undercuts and other features and thereby permit removal of the part 42 from the mold cavity 40. The collapsible mold core assembly 100 then appears as illustrated in FIGS. 5, 6 and 9.

The plurality of first mold segments 108 are in the same positions at the completion of the cycle as they were after the initial unison motion of the platens 24 and 28 with the first and second ejector plate assemblies 62 and 72. This position is illustrated in FIG. 6. However, because the plurality of second mold core segments 138 are confined in the second, lower platen assembly 28, translate therewith and are constrained for motion normal to the reference axis A, as the platens 24 and 28 continue to translate the second plurality of ejector blades 168 restrain the intermediate members 154 while the plurality of second mold core segments 138 continue to translate upwardly and thus inwardly along paths defined by the T-shaped slots 140 in the second mold core segments 138 and the oblique inwardly converging T-shaped projections 152 on the plurality of intermediate members 154. Thus, the second mold core segments 138 translate radially inwardly thereby releasing the molded part 42. It will be appreciated that radially inward collapse of the plurality of second mold core segments 138 need occur only to the extent necessary to provide clearance for undercuts or other interior features and thus permit removal of the molded part 42.

Lastly, the second ejector plate assembly 72 is translated upwardly relative to the first ejector plate assembly 62 by activation of the linear actuators 80, thereby translating the ejector pins 84 into the mold cavity 40 and ejecting the molded part 42. To prepare for the production of another part 42, the foregoing steps are reversed and the injection molding apparatus 10 and the collapsible mold core assembly 100 are returned to the positions illustrated in FIG. 1.

The foregoing disclosure is the best mode devised by the inventor for practicing this invention. It is apparent, however, that apparatus incorporating modifications and variations will be obvious to one skilled in the art of injection molding. Inasmuch as the foregoing disclosure is intended to enable one skilled in the pertinent art to practice the instant invention, it should not be construed to be limited thereby but should be construed to include such aforementioned obvious variations and be limited only by the spirit and scope of the following claims.

I claim:

1. A collapsible mold core assembly comprising, in combination,
    a stanchion defining a center axis,
    a plurality of first mold core segments each having a core molding surface,
    first cooperating means on said stanchion and said plurality of first mold core segments for slidingly linking said first mold core segments to said stanchion for bidirectional translation along paths oriented at a small acute angle to said axis,
    a plurality of second mold core segments each having a core molding surface,
    an intermediate member associated with each of said plurality of second mold core segments,
    second cooperating means on said plurality of second mold core segments, said intermediate members and said stanchion for slidingly linking said intermediate members to a respective one of said plurality of second mold core segments and said stanchion for bidirectional translation of said intermediate members along paths substantially parallel to said axis and translation of said plurality of second mold core segments along paths oriented at a small acute angle to said axis, and
    means for translating said first mold segments and said intermediate members relative to said stanchion.

2. The collapsible mold core assembly of claim 1 wherein said pluralities of first and said second mold core segments are disposed in alternation about said stanchion.

3. The collapsible mold core assembly of claim 1 including four first mold core segments, four second mold core segments and four intermediate members.

4. The collapsible mold core assembly of claim 1 wherein said small acute angle is between 2° and 8°.

5. The collapsible mold core assembly of claim 1 wherein said first and second cooperating means are pairs of interengaging T-shaped slots and projections.

6. The collapsible mold core assembly of claim 1 wherein said cooperating means includes slots in said stanchion and said plurality of second mold core segments and projections complemental to said slots on said plurality of said first mold core segments and said intermediate members.

7. The collapsible mold core assembly of claim 1 further including means for translating said second mold segments relative to said stanchion.

8. A collapsible core assembly for disposition in a mold cavity comprising, in combination,
    a stanchion defining a center axis,
    a plurality of first core segments each having a core molding surface,
    first cooperating means on said stanchion and said plurality of first core segments for slidingly linking said first core segments to said stanchion for bidirectional translation along paths oriented at a small acute angle to said axis,
    a plurality of second core segments each having a core molding surface,
    an intermediate member associated with each of said plurality of second core segments,
    second cooperating means on said stanchion and said intermediate members for slidingly linking said intermediate members and said stanchion and guiding said intermediate members along paths substantially parallel to said axis, third cooperating means on said plurality of second core segments and said intermediate members for slidingly linking said intermediate members to a respective one of said plurality of second core segments and guiding said second plurality of segments along paths oriented at a small acute angle to said axis, and means for translating said first mold segments and said intermediate members relative to said stanchion.

9. The collapsible core assembly of claim 8 wherein said pluralities of first and said second core segments are disposed in alternation about said stanchion.

10. The collapsible core assembly of claim 8 including four first core segments, four second core segments and four intermediate members.

11. The collapsible core assembly of claim 8 wherein said small acute angle is an angle of sufficient magnitude to effect radial movement of said plurality of first and second core segments sufficient to permit removal of a molded part.

12. The collapsible core assembly of claim 8 wherein said first, second and third cooperating means are pairs of interengaging T-shaped slots and projections.

13. The collapsible core assembly of claim 8 further including means for translating said second core segments relative to said stanchion.

14. The collapsible core assembly of claim 8 further including means for constraining said plurality of second core segments for translation in a plane normal to said center axis.

15. A mold assembly having a collapsible core comprising, in combination, a mold cavity, a stanchion disposed at least partially within said mold cavity and defining a center axis, a plurality of first core segments each having a molding surface, first means on said stanchion and said plurality of first core segments for slidingly linking said first core segments to said stanchion and guiding said first core segments along paths oriented at a small acute angle to said axis, a plurality of second core segments each having a molding surface, a plurality of intermediate members, each of said plurality of members associated with a respective one of said plurality of second core segments, and second means on said stanchion and said intermediate members for linking said intermediate members to said stanchion and guiding said intermediate members along paths substantially parallel to said center axis, third means on said plurality of second core segments and said intermediate members for linking said intermediate members to a respective one of said plurality of second core segments and guiding said second plurality of segments along paths oriented at a small acute angle to said center axis, means for bidirectionally translating said plurality of first core segments and said plurality of intermediate members relative to said stanchion, and means for bidirectionally translating said second core segments relative to said stanchion.

16. The mold assembly of claim 15 wherein said small acute angle is an angle of sufficient magnitude to effect radial movement of said plurality of first and second core segments sufficient to permit removal of the molded part.

17. The mold assembly of claim 15 wherein said first means, said second means and said third means are complemental pairs of T-shaped channels and projections.

18. The mold assembly of claim 15 wherein said first core segments and said second core segments are disposed in alternation about said stanchion and four said first core segments and four said second core segments are utilized.

19. The mold assembly of claim 15 wherein said small acute angle is between 2° and 8°.

20. The mold assembly of claim 15 wherein said second plurality of core segments are confined for motion in a plane substantially normal to said center axis.

* * * * *